US012645381B2

(12) United States Patent
  Majerowicz

(10) Patent No.: US 12,645,381 B2
(45) Date of Patent: Jun. 2, 2026

(54) SYSTEM, METHOD, AND COMPUTER PROGRAM FOR MEMORY EFFICIENT COLLECTIONS OPTIMIZED FOR ELEMENT PROCESSING

(71) Applicant: Amdocs Development Limited, Limassol (CY)

(72) Inventor: Lucas Dario Majerowicz, Herzlyia (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 18/679,166

(22) Filed: May 30, 2024

(65) Prior Publication Data

US 2025/0370642 A1 Dec. 4, 2025

(51) Int. Cl.
  *G06F 3/06* (2006.01)

(52) U.S. Cl.
  CPC .......... *G06F 3/0638* (2013.01); *G06F 3/0604* (2013.01); *G06F 3/0679* (2013.01)

(58) Field of Classification Search
  None
  See application file for complete search history.

(56) References Cited

U.S. PATENT DOCUMENTS

| | | | |
|---|---|---|---|
| 2006/0047717 A1 | 3/2006 | Pereira | |
| 2007/0226417 A1* | 9/2007 | Davis | G06F 12/0802 |
| | | | 711/E12.017 |

| | | | |
|---|---|---|---|
| 2008/0133561 A1* | 6/2008 | Dubnicki | G06F 16/113 |
| 2013/0138653 A1* | 5/2013 | Raichelgauz | G06F 16/41 |
| | | | 707/737 |
| 2013/0212584 A1* | 8/2013 | Heit | G06F 9/5066 |
| | | | 718/102 |
| 2014/0173258 A1* | 6/2014 | Fahs | G06F 9/3851 |
| | | | 712/225 |
| 2017/0168697 A1* | 6/2017 | Shpalter | G06F 3/04847 |
| 2017/0344882 A1 | 11/2017 | Ambrose et al. | |
| 2020/0193044 A1* | 6/2020 | Dyvadheenam | H04L 67/568 |
| 2020/0250101 A1* | 8/2020 | Patsilaras | H03M 7/30 |
| 2020/0379664 A1* | 12/2020 | Mittal | G06F 3/0646 |
| 2024/0037835 A1 | 2/2024 | Croxford et al. | |
| 2025/0117999 A1* | 4/2025 | Pham | G06Q 10/043 |

OTHER PUBLICATIONS

International Search Report and Written Opinion from PCT Application No. PCT/IB2025/055508, dated Sep. 11, 2025, 9 pages.

* cited by examiner

*Primary Examiner* — Yaima Rigol

(74) *Attorney, Agent, or Firm* — Zilka-Kotab, P.C.

(57) ABSTRACT

As described herein, a system, method, and computer program are provided for batching a collection of elements in local memory for processing. A single collection of elements of data is stored in a local memory across a plurality of sub-collections. The single collection of elements is processed on a sub-collection basis, where each sub-collection is removed from the local memory upon completion of the processing of the elements in the sub-collection.

8 Claims, 5 Drawing Sheets

100

102 store in a local memory a single collection of elements of data across a plurality of sub-collections 104 process the single collection of elements on a sub-collection basis, wherein each sub-collection is removed from the local memory upon completion of the processing of the elements in the sub-collection

100

102 — store in a local memory a single collection of elements of data across a plurality of sub-collections 104 — process the single collection of elements on a sub-collection basis, wherein each sub-collection is removed from the local memory upon completion of the processing of the elements in the sub-collection

200

300

302 — identify a sub-collection of elements from a local memory

304 — iteratively process elements in the identified sub-collection

306 — remove the identified sub-collection from the local memory

308 — next sub-collection Identified from the local memory?

YES

NO end

400

SYSTEM, METHOD, AND COMPUTER PROGRAM FOR MEMORY EFFICIENT COLLECTIONS OPTIMIZED FOR ELEMENT PROCESSING

FIELD OF THE INVENTION

The present invention relates to organization of data in memory for efficient memory utilization.

BACKGROUND

Typically, for a very large collection (e.g. millions) of elements of data stored in memory, performing a certain action for each element requires iterating over every one of the elements in the collection to individually perform the action on each of the elements. While this procedure will work as expected without problems, there are some disadvantages to the approach. In particular, the elements in the collection must be fully kept in local memory throughout the entire iteration execution. For example, if the list has one million elements and currently the 1 millionth element is being processed, then the first 999,999 already processed elements will still be kept in local memory. The collection of elements can only be released from local memory after the iteration process has finished.

A naive approach for releasing memory during iteration would be to remove each element from the collection after it has been individually processed. However, this approach has the disadvantage of being costly in terms of compute resources. In particular, while this approach would address the need for releasing local memory as the iteration process takes place, it would significantly increase the total execution running time for the collection.

There is thus a need for addressing these and/or other issues associated with the prior art. For example, there is a need to provide memory efficient collections of data elements which are optimized for element processing.

SUMMARY

As described herein, a system, method, and computer program are provided for batching a collection of elements in local memory for processing. A single collection of elements of data is stored in a local memory across a plurality of sub-collections. The single collection of elements is processed on a sub-collection basis, where each sub-collection is removed from the local memory upon completion of the processing of the elements in the sub-collection.

DETAILED DESCRIPTION

Figure 1:
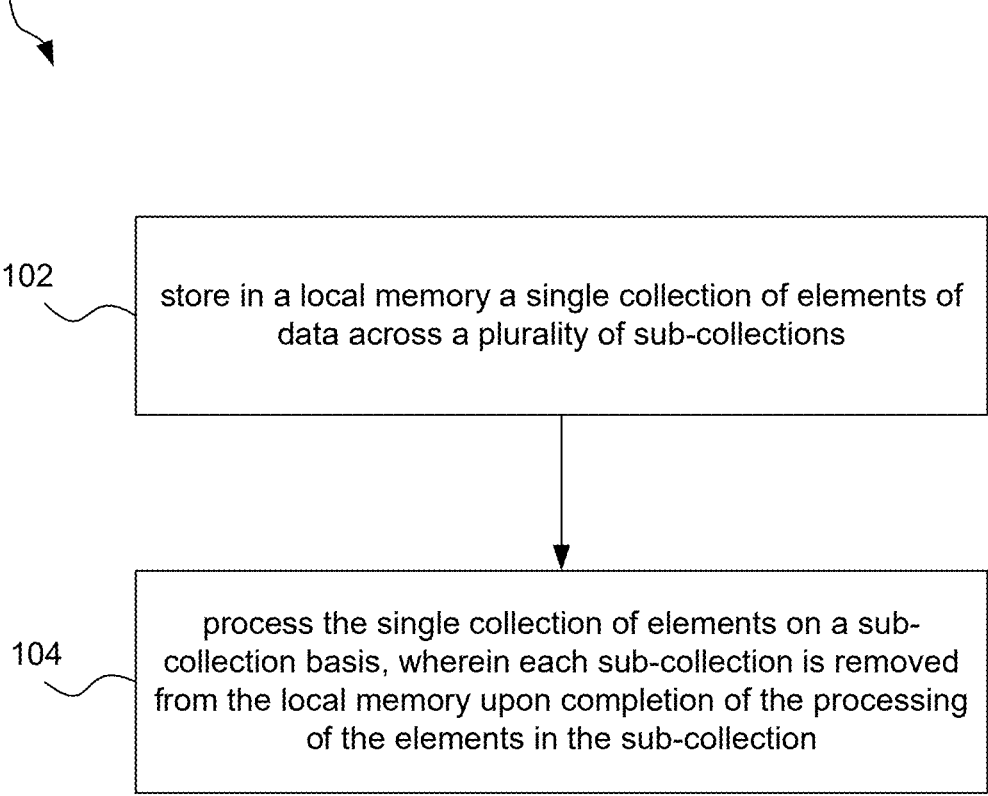
FIG. 1 illustrates a method for batching a collection of elements in local memory for processing, in accordance with one embodiment.

FIG. 1 illustrates a method for . . . , in accordance with one embodiment. The method may be carried out by a computer system, such as that described below with respect to FIGS. 4 and/or 5.

In operation 102, a single collection of elements of data is stored in local memory across a plurality of sub-collections. The single collection of elements of data refers to a plurality of data elements that are stored or otherwise defined as a single collection. The elements may be values, strings, etc. New elements may be added to the single collection, existing elements may be removed from the single collection, and existing elements within the single collection may be modified, using various memory operations.

Moreover, the single collection of elements may be processed as a group. For example, one or more defined actions may be triggered for the single collection of elements. This may in turn cause the one or more defined actions to be performed for every individual element in the single collection.

In an embodiment, the single collection of elements may be initially stored remotely (e.g. with respect to the system performing the method 100). In an embodiment, the single collection may be stored as a single unit in the remote memory. In another embodiment, the single collection may be stored across the plurality of sub-collections in the remote memory. In an embodiment, the single collection of elements may be transferred (e.g. as a single unit) to the local memory and stored across the plurality of sub-collections in the local memory. A sub-collection refers to a subset, or portion, of the single collection, with each different sub-collection having a different subset of the elements. A sub-collection may be configured as a vector or array of elements.

In an embodiment, each of the sub-collections may be configured to store up to a maximum (i.e. defined threshold) number of elements. In an embodiment, an element may be placed in one of the sub-collections when added to the single collection of elements. In an embodiment, an existing sub-collection may be filled (i.e. up to the maximum) with elements before a new sub-collection is created.

In operation 104, the single collection of elements is processed on a sub-collection basis, where each sub-collection is removed from the local memory upon completion of the processing of the elements in the sub-collection. In an embodiment, the single collection of elements may be transferred to the local memory (e.g. from the remote memory) for the processing. In another embodiment, the sub-collections may be transferred to the local memory (e.g. from the remote memory) together for the processing. For example, the sub-collections may be transferred to the local memory in a single operation. The local memory may refer to a memory that is local to a processor performing the processing.

The processing refers to performing any defined operation(s) on the elements in the single collection. In an embodiment, the processing may be performed responsive to an application programming interface (API) request to process the single collection of elements. In an embodiment, the processing includes performing a single defined action on each element in the single collection of elements. In another embodiment, the processing may include performing a plurality of defined actions on each element in the single collection of elements.

In an embodiment, processing the single collection of elements on a sub-collection basis may include iteratively processing the plurality of sub-collections and removing each sub-collection from the local memory once the processing of the sub-collection is complete. In an embodiment, processing a sub-collection may include iteratively processing elements in the sub-collection. In an embodiment, removing each sub-collection from the local memory may include removing all of elements in the sub-collection from the local memory upon completion of the processing of all of the elements in the sub-collection. In an embodiment, all of the elements in the sub-collection may be removed from the local memory in a single operation. In an embodiment, after removing a sub-collection from the local memory, then a next sub-collection may be processed.

To this end, the method 100 may release elements in the collection from memory in batches, namely per sub-collection as each sub-collection is processed. In this way, near the end of the processing of the entire collection, little memory will be being used. This method 100 may allow the processing of multiple data element collections to run at the same time with a significantly smaller total memory requirement than prior art solutions which only release elements from memory once the entire collection has been processed.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
FIG. 2 illustrates a system for batching a collection of elements in local memory for processing, in accordance with one embodiment.
Figure 2:
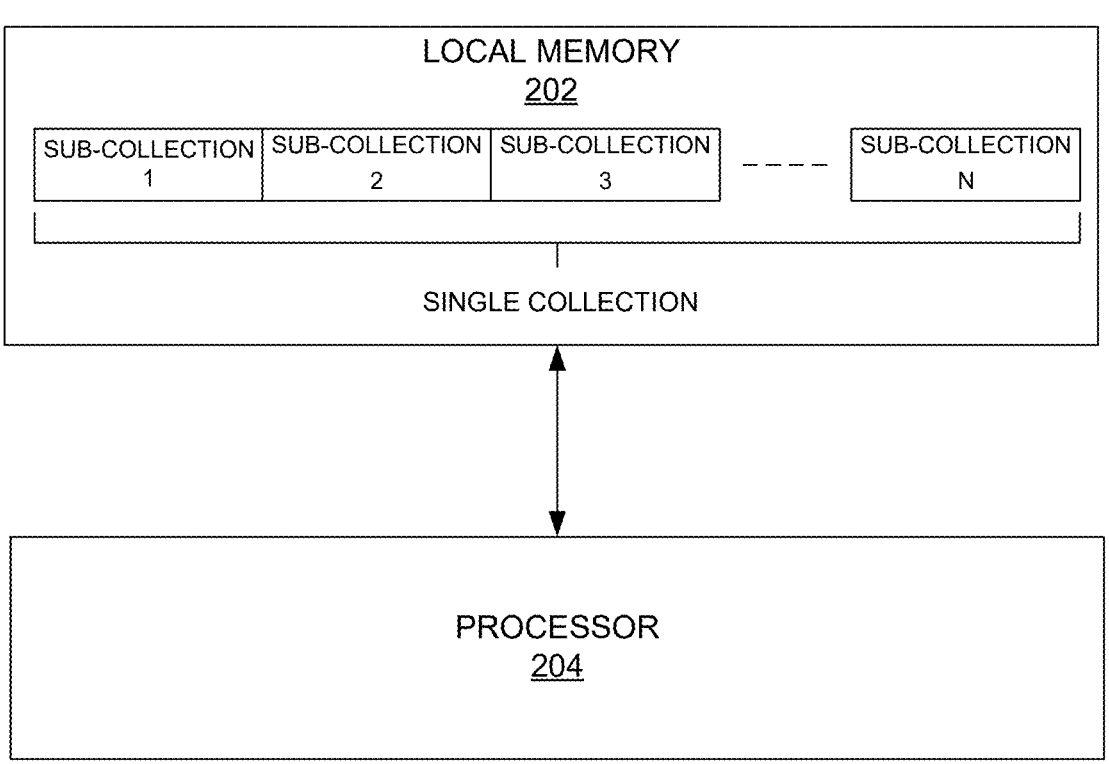

FIG. 2 illustrates a system 200 for batching a collection of elements in local memory for processing, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, a local memory 202 stores a single collection of elements of data across a plurality (e.g. sequence) of sub-collections 1-N. The single collection of elements may be transferred to the local memory 202 from a remote memory (not shown). The single collection of elements may be transferred to the local memory 202 for processing by the processor 204. For example, the single collection of elements may be transferred to the local memory 202 in response to an API request to process the single collection of elements.

The processor 204 processes the single collection of elements in batches, namely per sub-collection 1-N. As processing of a sub-collection by the processor 204 completes, the sub-collection is removed from the local memory 202. After the sub-collection is removed from the local memory 202, a next sub-collection in the local memory 202 is processed.

Figure 3:
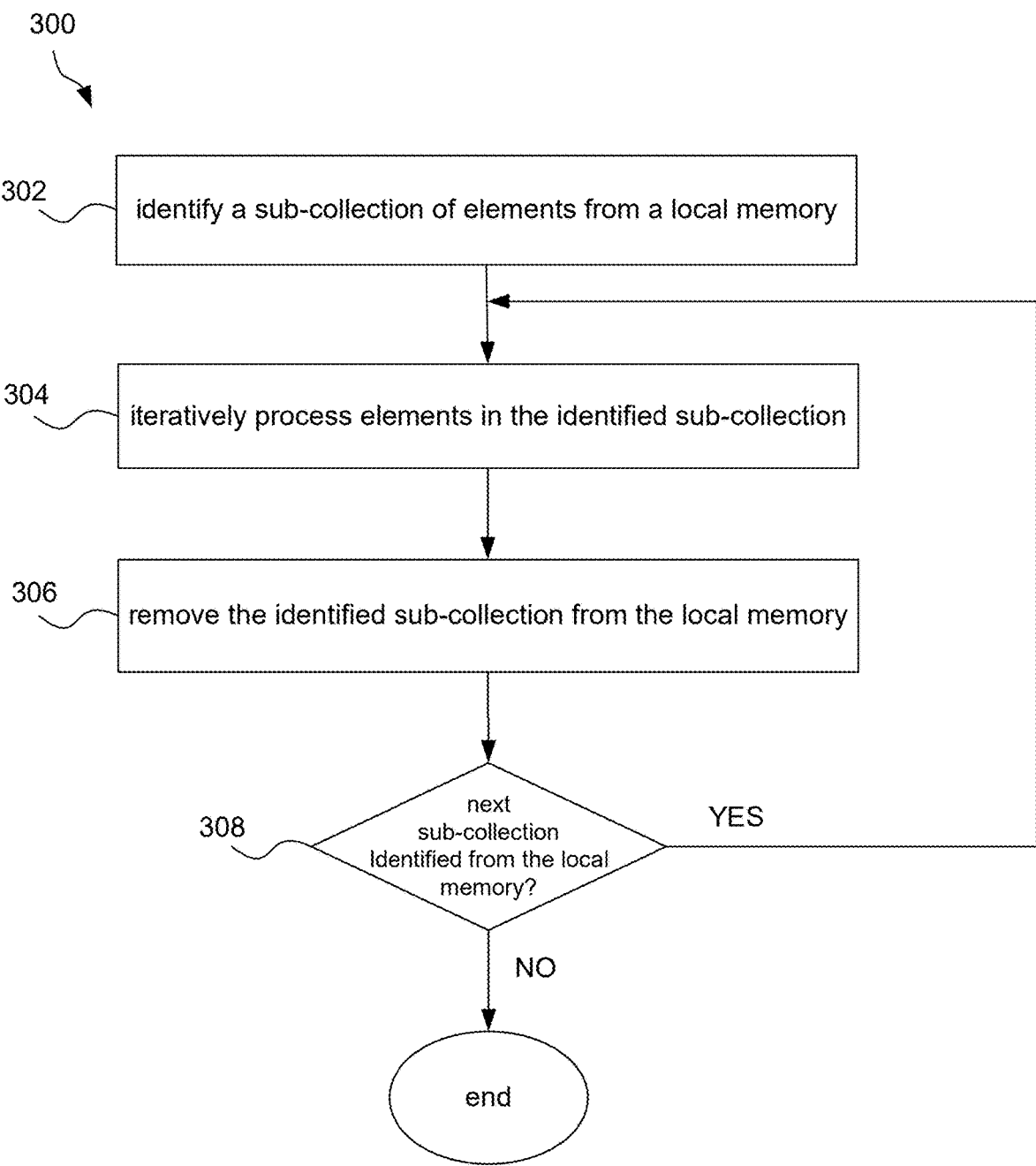
FIG. 3 illustrates a method for managing a collection of elements in memory, in accordance with one embodiment.

FIG. 3 illustrates a method 300 for managing a collection of elements in memory, in accordance with one embodiment. As an option, the method 300 may be carried out in the context of the details of the previous figure and/or any subsequent figure(s). For example, the method 300 may be carried out by the processor 204 of FIG. 2. Of course, however, the method 300 may be carried out in the context of any desired environment. Further, the aforementioned definitions may equally apply to the description below.

In operation 302, a sub-collection of elements is identified from a local memory. The sub-collection refers to one of a plurality of sub-collections across which a single collection of data elements is stored. The sub-collection that is identified may be a first sub-collection in a sequence of the sub-collections forming the single collection of data elements. The first sub-collection may be identified responsive to an API request to process the single collection of data elements.

In operation 304, elements in the identified sub-collection are iteratively processed. In an embodiment, the sub-collection may store elements in a sequence such that the processing may proceed iteratively through the sequence of elements. The processing may include performing one or more defined actions on each element.

In operation 306, the identified sub-collection is removed from the local memory. In other words, the identified sub-collection is removed from the local memory in response to the processing of the sub-collection in operation 304 completing. For example, once the processing iterates over all of the elements in the sub-collection, then the sub-collection may be removed from the local memory.

In decision 308 it is determined whether a next sub-collection is identified from the local memory. For example, it may be determined whether another unprocessed sub-collection exists in the local memory for the single collection of data elements. In response to determining that a next sub-collection is identified from the local memory, the method 300 returns to operation 304 to iteratively process the elements in that sub-collection. In response to determining that a next sub-collection is not identified from the local memory, thus indicating that all elements in the single collection have been processed, the method 300 ends.

Exemplary Implementation

A new type of collection, called BatchedCollection, is defined which internally is composed of a variable number of sub-collections. Each subcollection is referred to as a batch.

Adding Items to BatchedCollection

A threshold is defined for how big a batch can get. When adding a new element to the collection, depending on the size of the current batch, that new element is put either in that current batch or in a new batch (and that new batch will become the new currentbatch).

Example (with Max Batch Size=3)

1. Start empty→BatchedCollection=[ ]
2. Add 1→BatchedCollection=[[1]]
3. Add 2→BatchedCollection=[[1, 2]]
4. Add 3→BatchedCollection=[[1, 2, 3]]
5. Add 4→BatchedCollection=[[1, 2, 3], [4]]
6. Add 5→BatchedCollection=[[1, 2, 3], [4, 5]],
7. Add 6→BatchedCollection=[[1, 2, 3], [4, 5, 6]]
8. Add 7→BatchedCollection=[[1, 2, 3], [4, 5, 6], [7]]
9 . . .

In a real application, when expecting to store millions of elements, a max batch size value of approximately 1,000 or even higher may be used.

Processing Elements

The structure of the BatchedCollection allows to process elements as follows:

1. for each batch in BatchedCollection
1.a. for each element in batch
1.a.1. perform action for element 2. clear batch from memory As each batch is processed, that batch contents are cleared from memory before moving on to the next batch. That will release the memory that the elements in that batch were occupying.

Example

1. Start with BatchedCollection=[[1, 2, 3], [4, 5, 6], [7]]
2. After processing batch [1, 2, 3]→BatchedCollection=[[ ], [4, 5, 6], [7]]
3. After processing batch [4, 5, 6]→BatchedCollection=[[ ], [ ], [7]]
4. After processing batch [7]→BatchedCollection=[[ ], [ ], [ ]]

In the present example, as Batch N is processed, the contents of all previous N−1 batches will have been cleared.

Summary

While the standard approach for iterating over elements allows releasing the collection's memory contents only at the end of the execution of the entire collection, the embodiments described above instead releases memory throughout the entire execution process. With this approach, the amount of memory released will be inversely proportional to the number of elements that have been processed so far. In particular, a considerably lower memory utilization will be achieved via the embodiments disclosed herein, for both peak memory utilization and average memory utilization.

Furthermore, in the use case scenario of handling multiple, concurrent, different API requests, with each request triggering the processing of millions of elements, being able to release memory as each collection is processed will allow accepting more requests with the same amount of memory. Using the embodiments disclosed herein, a higher number of concurrent API requests may be allowed with lower memory requirements.

Figure 4:
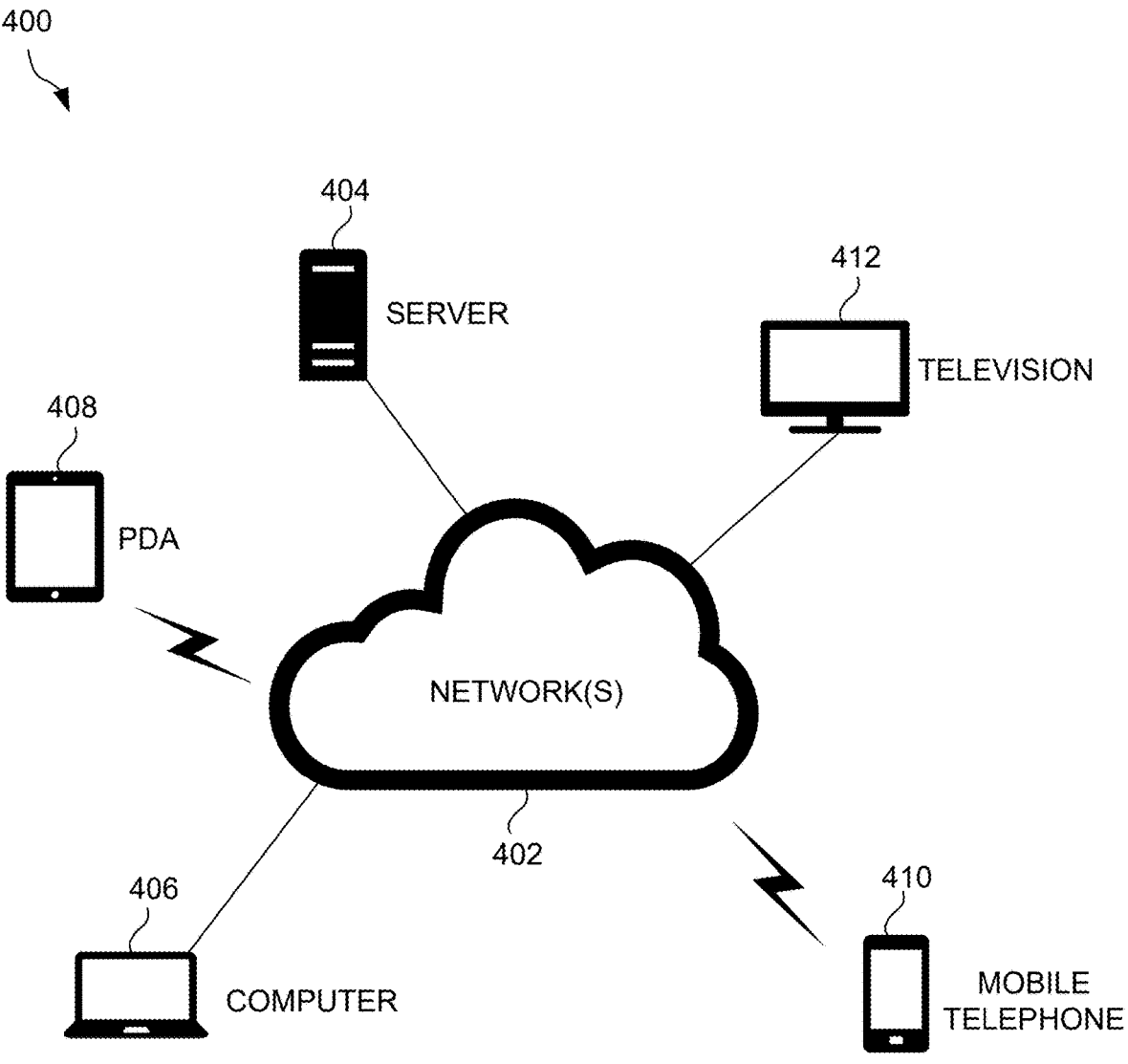
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
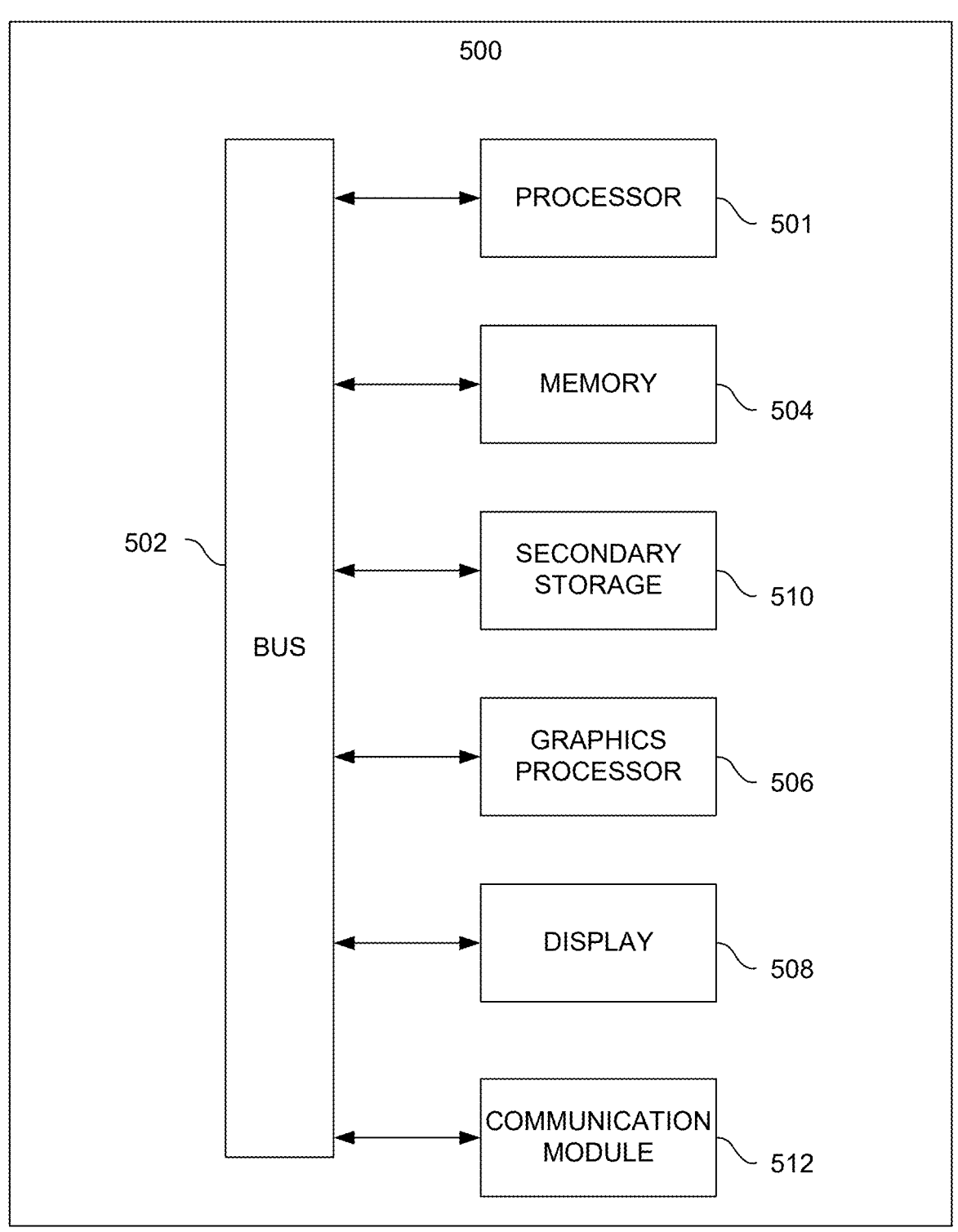
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512. The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:
   retrieve an entirety of a single collection of elements of data stored in a remote memory, wherein the single collection of elements of data are stored in the remote memory as a single unit;
   store the entirety of the single collection of elements of data in a local memory as a plurality of sub-collections of elements by apportioning the single collection of elements into sub-collections each comprised of more than one element and up to a predetermined threshold number of elements and storing the sub-collections in the local memory; and
   process the single collection of elements on a sub-collection basis, including iteratively processing the plurality of sub-collections by:
      for a sub-collection of the plurality of sub-collections being processed in a current iteration, processing the elements in the sub-collection on an element-by-element basis, including iteratively performing one or more defined actions on the elements in the sub-collection, and
      removing the sub-collection from the local memory upon completion of the processing of all of the elements in the sub-collection and before the processing of a next one of the sub-collections in a next iteration.

2. The non-transitory computer-readable media of claim 1, wherein during the apportioning of the single collection of elements into sub-collections, an existing sub-collection is filled with the predetermined threshold number of elements before a new sub-collection is created.

3. The non-transitory computer-readable media of claim 1, wherein the single collection of elements is retrieved from the remote memory for the processing.

4. The non-transitory computer-readable media of claim 1, wherein removing each sub-collection from the local memory includes removing all of elements in the sub-collection from the local memory upon completion of the processing of all of the elements in the sub-collection.

5. The non-transitory computer-readable media of claim 4, wherein all of the elements in the sub-collection are removed from the local memory in a single operation.

6. The non-transitory computer-readable media of claim 1, wherein the processing is performed responsive to an application programming interface (API) request to process the single collection of elements.

7. A method, comprising:
   at a computer system:

retrieving an entirety of a single collection of elements of data stored in a remote memory, wherein the single collection of elements of data are stored in the remote memory as a single unit;

storing the entirety of the single collection of elements of data in a local memory as a plurality of sub-collections of elements by apportioning the single collection of elements into sub-collections each comprised of more than one element and up to a predetermined threshold number of elements and storing the sub-collections in the local memory; and processing the single collection of elements on a sub-collection basis, including iteratively processing the plurality of sub-collections by:

for a sub-collection of the plurality of sub-collections being processed in a current iteration, processing the elements in the sub-collection on an element-by-element basis, including iteratively performing one or more defined actions on the elements in the sub-collection, and removing the sub-collection from the local memory upon completion of the processing of all of the elements in the sub-collection and before the processing of a next one of the sub-collections in a next iteration.

8. A system, comprising:

a non-transitory memory storing instructions; and one or more processors in communication with the non-transitory memory that execute the instructions to:

retrieve an entirety of a single collection of elements of data stored in a remote memory, wherein the single collection of elements of data are stored in the remote memory as a single unit;

store the entirety of the single collection of elements of data in a local memory as a plurality of sub-collections of elements by apportioning the single collection of elements into sub-collections each comprised of more than one element and up to a predetermined threshold number of elements and storing the sub-collections in the local memory; and process the single collection of elements on a sub-collection basis, including iteratively processing the plurality of sub-collections by:

for a sub-collection of the plurality of sub-collections being processed in a current iteration, processing the elements in the sub-collection on an element-by-element basis, including iteratively performing one or more defined actions on the elements in the sub-collection, and removing the sub-collection from the local memory upon completion of the processing of all of the elements in the sub-collection and before the processing of a next one of the sub-collections in a next iteration.

* * * * *